United States Patent [19]
Laakmann

[11] Patent Number: 5,409,314
[45] Date of Patent: Apr. 25, 1995

[54] POCKET SIZE LASER POWER METER

[75] Inventor: Peter Laakmann, Bothell, Wash.

[73] Assignee: Synrad, Bothell, Wash.

[21] Appl. No.: 79,318

[22] Filed: Jun. 17, 1993

[51] Int. Cl.⁶ .......................................... G01K 17/00
[52] U.S. Cl. .................................. 374/32; 250/338.1; 250/340; 356/216
[58] Field of Search ............... 374/32; 250/340, 338.1; 356/216

[56] References Cited

U.S. PATENT DOCUMENTS

| | | | |
|---|---|---|---|
| 3,487,685 | 1/1970 | Shifrin | 374/32 |
| 3,575,048 | 4/1971 | De Benedictis | 374/32 |
| 3,659,102 | 4/1972 | Toriyama | 250/458.1 |
| 3,783,685 | 1/1974 | Zeiders, Jr. et al. | 374/32 |
| 4,037,470 | 7/1977 | Mock et al. | 374/32 |
| 4,321,824 | 3/1982 | Martin | 374/32 |
| 4,413,916 | 11/1983 | Seguin | 374/32 |
| 4,436,437 | 3/1984 | Beggs et al. | 374/32 |
| 4,765,749 | 8/1988 | Bourgade et al. | 374/32 |
| 4,865,446 | 9/1989 | Inoue et al. | 374/32 |
| 4,964,735 | 10/1990 | Sasnett et al. | 374/32 |
| 5,083,289 | 1/1992 | Kuroda et al. | 374/32 |
| 5,156,459 | 10/1992 | Baker et al. | 374/32 |
| 5,209,567 | 5/1993 | Loosen et al. | 374/32 |
| 5,316,380 | 5/1994 | Secemski | 374/32 |

FOREIGN PATENT DOCUMENTS

| | | | |
|---|---|---|---|
| 2713874 | 10/1978 | Germany | 374/32 |
| 0035027 | 4/1981 | Japan | 374/32 |

OTHER PUBLICATIONS

Zimmerer, R. W., "Measuring Laser Power," Optical Spectra, pp. 34–36 (Feb. 1978).

Gunn, Stuart, "Calorimetric Measurements of Laser Energy and Power," Journal of Physics E., Scientific Instruments, vol. 6, No. 2 (Feb. 1973), pp. 105–114.

Primary Examiner—Diego F. F. Gutierrez
Attorney, Agent, or Firm—Seed and Berry

[57] ABSTRACT

A pocket size laser power meter adapted to measure the power of laser energy emitted by a laser. The power meter includes a thermal mass adapted to receive the laser energy. A temperature sensor coupled to the thermal mass translates temperature changes in the thermal mass into an electrical sensor signal having a variable voltage. A differentiator coupled to the temperature sensor receives the electrical sensor signal and produces a differentiated signal indicative of the rate of change of voltage of the electrical sensor signal. A cooling rate holding circuit coupled to the differentiator receives a cooling portion of the differentiated signal indicating a lowering of the temperature of the thermal mass. A heating rate holding circuit coupled to the differentiator receives a heating portion of the differentiated signal indicating a raising of the temperature of the thermal mass. A display meter coupled to the holding circuits adds the cooling and heating portions of the differentiated signal together, translates the differentiated signal into a power reading, and displays the power reading to a operator.

29 Claims, 5 Drawing Sheets

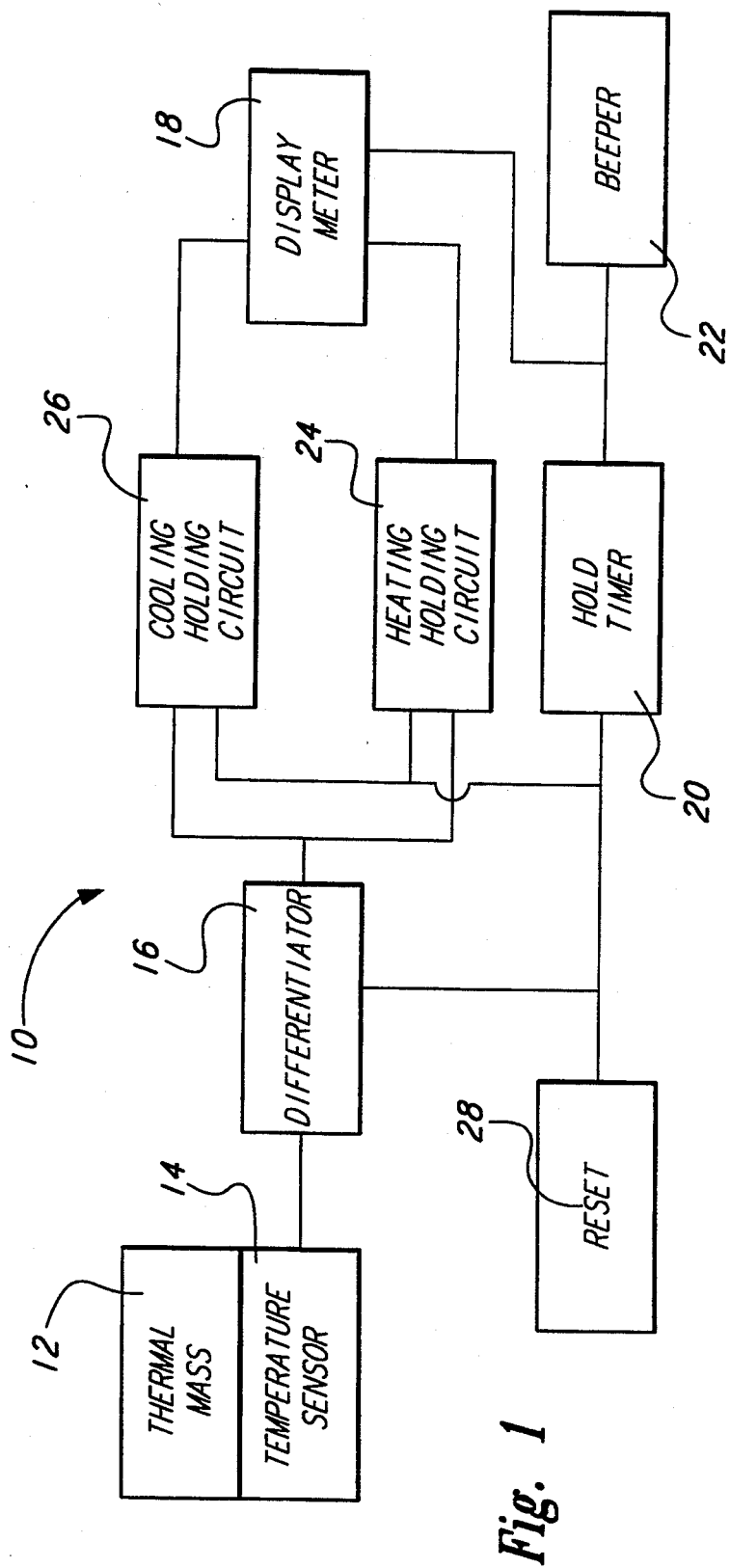
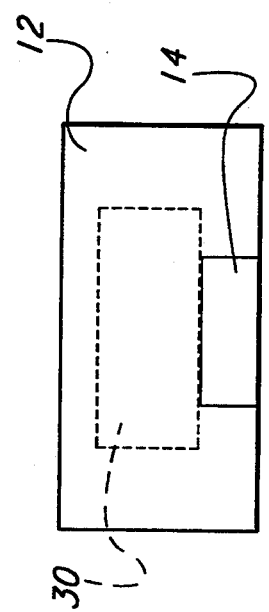
Fig. 1
Fig. 2

POCKET SIZE LASER POWER METER

TECHNICAL FIELD

The present invention relates to power meters and, more particularly, to meters capable of displaying the power emitted by a laser.

BACKGROUND OF THE INVENTION

Laser power meters in the several watt to several hundred watt range include two general types: a mechanical probe similar to a meat thermometer provided with a heat sink at the tip and an electronic meter having a thermopile detector and remote read out unit.

The meat thermometer-type meter is "exposed" to the laser beam for a period of time, typically 20 seconds. The temperature rise is recorded by a mechanical needle movement from a bi-metal element in the probe. The temperature rise in the exposure period is proportional to input power. Except for the tip-mounted heat sink, the meat thermometer-type meter looks exactly like the commonly used meat thermometer and costs typically about $200.

The thermopile-based instrument records power continuously, with a delay time of less than 1 second. This is a large, precise laboratory instrument costing typically about $2,000. The thermopile-based instrument is used to tune and optimize lasers. It includes a "power head" that is separated from a display console by a cable.

Although the meat thermometer-type meter is fairly portable, it is both inaccurate and slow. The meat thermometer-type meter requires a separate stopwatch to measure the exposure period. As the exposure timing is critical for accurate power measurement, the meat thermometer-type meter has been found to be deficient. Further, the exposure time is relatively long and a long time is required between uses to let the heat sink cool. The required delay between uses is typically a few minutes.

The limitation on the thermopile instrument is not in the performance and accuracy area. Its limitation is portability. The power head is large as it is designed for continuous duty. In many cases, the power head cannot be inserted into an existing beam delivery system because of its large size. Further, the separation of the power head from the display console renders the thermopile instrument somewhat less than ideal in terms of ease of use.

SUMMARY OF THE INVENTION

It is the object of this invention to eliminate the prior art limitations with a new class of portable power meter, while providing new capabilities.

It is another object to achieve a truly pocket size laser power meter.

It is another object to eliminate the need for a stopwatch and critical timing.

It is another object to increase speed of use and decrease recycling time when compared with prior art meat thermometer-type meters.

It is another object to achieve a larger power range than is currently available with a probe-type instrument.

A preferred embodiment of the invention is directed to a pocket size laser power meter. The power meter includes a thermal mass adapted to receive laser energy. A temperature sensor coupled to the thermal mass translates temperature changes in the thermal mass into an electrical sensor signal having a variable voltage. A differentiator coupled to the temperature sensor receives the electrical sensor signal and produces a differentiated signal indicative of the rate of change of voltage of the electrical sensor signal. A cooling rate holding circuit coupled to the differentiator receives a cooling portion of the differentiated signal indicating a lowering of the temperature of the thermal mass. A heating rate holding circuit coupled to the differentiator receives a heating portion of the differentiated signal indicating a raising of the temperature of the thermal mass. A display meter coupled to the holding circuits adds the cooling and heating portions of the differentiated signal together, translates the differentiated signal into a power reading, and displays the power reading to an operator.

BRIEF DESCRIPTION OF THE DRAWINGS

FIG. 1 is a block diagram of a laser power meter according to the present invention.

FIG. 2 is an elevation side view of a thermal mass and temperature sensor used in a preferred embodiment of the present invention.

DETAILED DESCRIPTION OF THE INVENTION

Figure 3A:
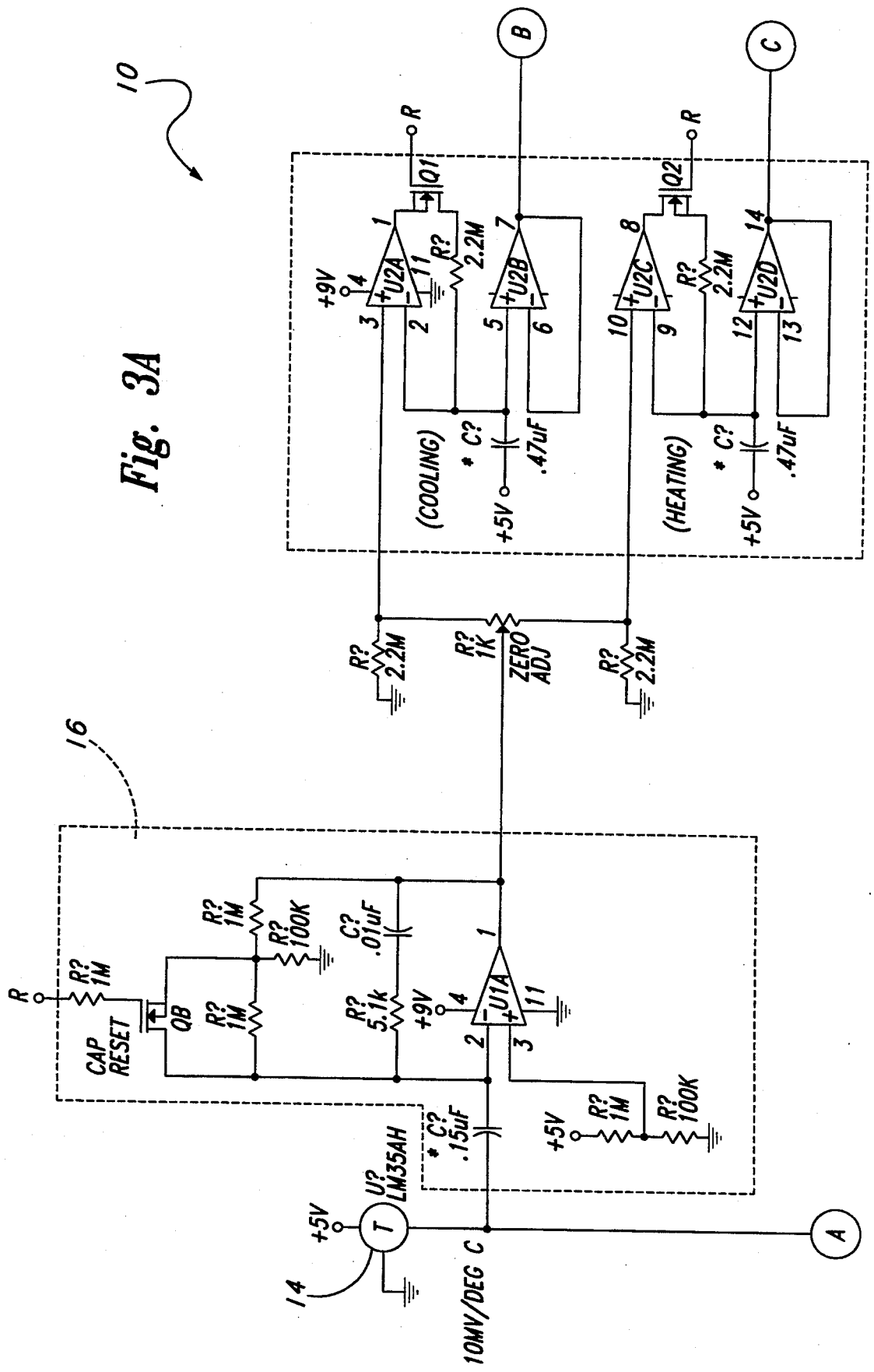
FIG. 3 is a detailed circuit diagram of a preferred embodiment of the present invention.

A preferred embodiment of the invention is directed to a pocket size laser power meter 10 as shown in FIG. 1. The power meter includes a thermal mass 12 at which laser energy is directed from a laser (not shown). The thermal mass is typically aluminum or other metal with a "black" absorbent coating. Coupled to the thermal mass 12 is a temperature sensor 14 that translates temperature changes in the thermal mass into an electrical sensor signal having a voltage that varies linearly in proportion with the temperature changes. The temperature sensor transmits the sensor signal to a differentiator 16 that produces a differentiated signal indicative of the rate of change of the voltage of the sensor signal. The differentiator transmits the differentiated signal to a display meter 18 that translates the differentiated signal into a power reading and displays the power reading to an operator.

Laser energy impinging onto the thermal mass 12 will create a temperature rise that is detected by the temperature sensor 14. Preferably, the temperature sensor is an electronic device mounted within the thermal mass. An example of such an electronic device is manufactured and marketed by National Semiconductor, Inc. under the name LM35AH. This device has excellent linearity of temperature versus voltage, as required.

As noted above, the temperature sensor 14 converts the temperature change into an electrical sensor signal having a varying voltage. After an initial delay period, the voltage varies substantially linearly with respect to time and is proportional to the power of the laser energy striking the thermal mass 12. The initial delay period is caused by the thermal diffusivity of the metal in the thermal mass 12.

In order to account for the initial delay period, the power meter 10 includes a hold timer 20 coupled to the display meter 18. After a predetermined delay time, the hold timer transmits a hold timing signal to the display meter. The display meter includes a data hold circuit that receives the hold timing signal and in response thereto holds the power reading constant. As such, the display meter ignores temperature changes occurring subsequent to its receipt of the hold timing signal. Preferably, the display meter is a conventional digital voltmeter, calibrated in power units, such as is manufactured and marketed by Modute C under the name BL100101H.

To alert the operator that the measurement period is complete, the power meter 10 includes a beeper 22 coupled to the hold timer 20. The hold timer transmits the hold timing signal to the beeper in addition to the display meter. In response to the hold timing signal, the beeper emits an audible signal, thereby informing the operator that the measurement period is complete and the power meter can be removed from the laser being measured.

For a single measurement, the power of the laser energy impinging onto the thermal mass 12 is proportional to the rate of increase of temperature measured by the temperature sensor 14. The rate of increase in temperature is translated by the temperature sensor to an electrical signal having a positively varying voltage. The differentiator 16 transmits this differentiated signal to the display meter 18 which displays a power reading based on the differentiated signal.

For subsequent measurements, the temperature of the thermal mass 12 may be elevated, causing a cooling rate in the absence of power. This cooling rate causes a differentiated signal of opposite polarity, that is, opposite to the differentiated signal produced during heating. It has been established that a true power reading can be determined by adding the cooling rate to the heating rate obtained in subsequent measurements. Either the cooling rate before the new measurement, or the cooling rate after the new measurement can be used. The display meter 18 can be calibrated either way.

To allow analysis of both cooling and heating rates, the power meter 10 preferably includes a heating rate holding circuit 24 and a cooling rate holding circuit 26, each of which is coupled between the differentiator 16 and the display meter 18. The heating rate holding circuit receives a heating portion of the differentiated signal for the period in which the thermal mass 12 is being heated. Similarly, the cooling rate holding circuit receives a cooling portion of the differentiated signal for the period in which the thermal mass 12 is being cooled. The holding circuits 24, 26 transmit their respective portions of the differentiated signal to the display meter 18. The display meter adds the heating and cooling portions together, translates the combined differentiated signal into a power reading, and displays the power reading to the operator.

The power meter 10 enables recycling for new measurements in seconds rather than tens of minutes as required by the prior art modified meat thermometer-type meters. By measuring instantaneous rate information rather than temperature change over a prolonged exposure time as required by the prior art, the power meter 10 does not allow the thermal mass 12 to get as hot as the thermal mass of the modified meat thermometer-type meter. Further, the thermal mass does not have to cool down fully to get accurate readings, as the rate of change of heating is not greatly affected by the temperature of the thermal mass. As a result, the time needed for cooling is less for the present invention than for the prior art. In addition, by measuring the cooling rate information, the power meter 10 obtains information that is useful in computing laser power, without requiring an operator to wait for the thermal mass to cool before obtaining any further useful information, as is required by the prior art modified meat thermometer-type meters.

To enable the operator to start a new measurement, the power meter 10 includes a reset button 28 coupled to the differentiator 16, hold timer 20, and holding circuits 24, 26. Upon being actuated by the operator, the reset button transmits a reset signal to the differentiator 16, hold timer 20, and holding circuits 24, 26, which sets them to zero and prepares them for a new measurement.

As discussed above, the thermal diffusivity of the metal in the thermal mass 12 causes an initial delay period in which the rate of increase of the sensor signal voltage is non-linear. Shown in FIG. 2 is a modified thermal mass 12 designed to equalize the effect of metal diffusivity across its surface. The thermal mass includes a void or chamber 30 adjacent the temperature sensor 14, which increases the diffusion time for laser energy applied in the area immediately adjacent the void.

Figure 3B:
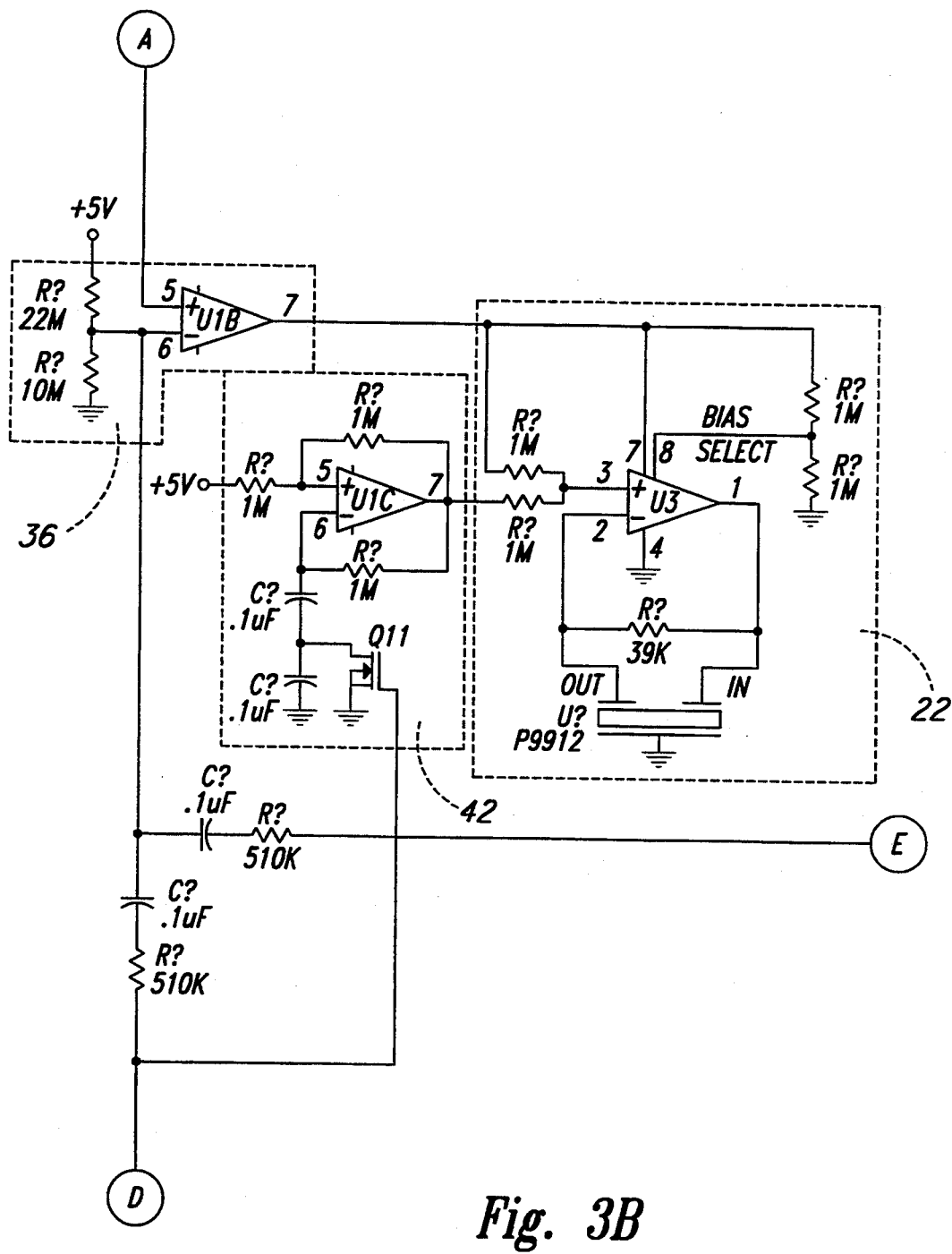
Figure 3C:
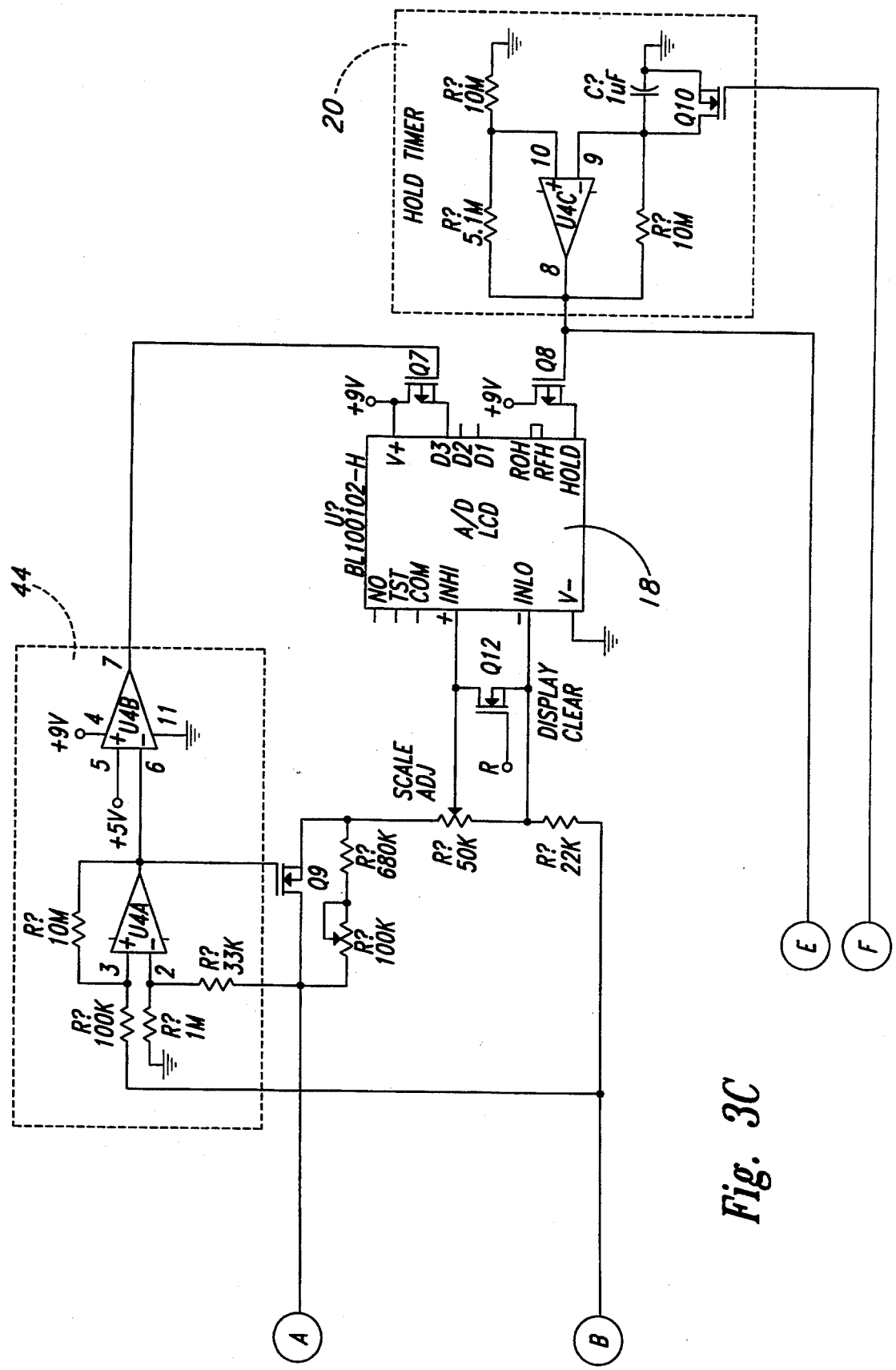
Figure 3D:
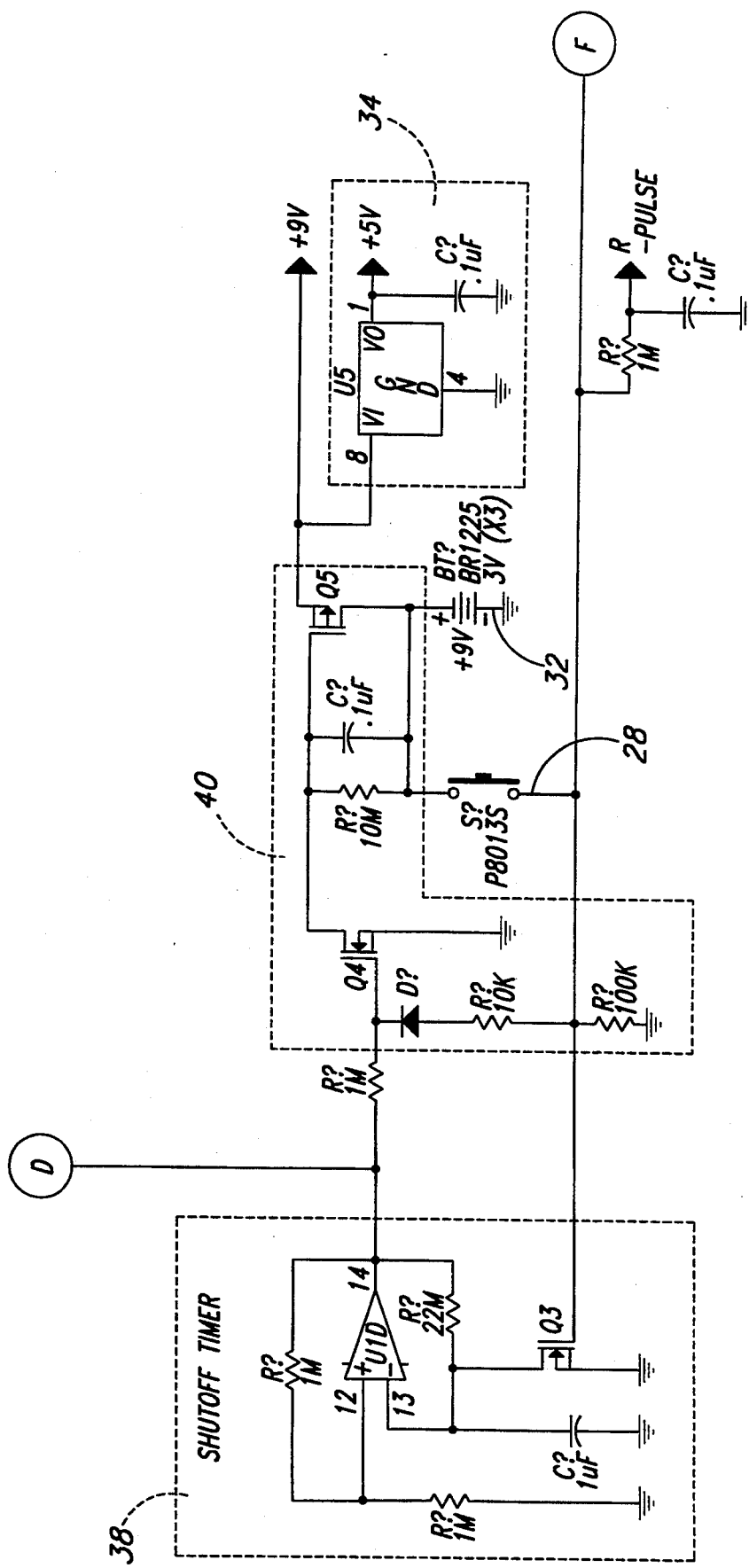

Shown in FIG. 3 is a detailed circuit diagram of a preferred embodiment of the laser meter 10 including several additional features not shown in FIG. 1. The circuit shown employs surface-mount integrated circuit (IC) technology. Such IC technology allows the power meter to be enclosed in a single case of approximate dimensions of 1.2×5.5×0.46 inches.

The individual circuit elements (amplifiers, transistors, resistors, etc.) forming each of the blocks shown in FIG. 1 are enclosed by dashed lines and are labeled according to the reference numbers used in FIG. 1. It will be apparent to those skilled in the art that the combinations of the particular discrete circuit elements shown (i.e. resistors, transistors, etc.) for each of the blocks operate according to the discussion above with respect to FIG. 1. As such, many of the discrete circuit elements will not be discussed in detail. It should be understood that the embodiment shown in FIG. 3 is exemplary only and is not intended to limit the invention to the circuit shown therein.

The power meter 10 is powered by a power source 32, which preferably is a nine volt Lithium battery designed to last several years. Coupled to the power source 32 is a conventional voltage regulator 34 adapted to provide a five volt signal to portions of the power meter 10 as shown in FIG. 3.

Because the power meter 10 measures instantaneous rate information rather than average temperature change over a prolonged exposure period, it is less likely for the thermal mass 12 to get as hot as the prior art modified meat thermometer-type meters. However, the power meter 10 includes a maximum temperature sensing circuit 36 coupled to the temperature sensor 14 and the beeper 22. If the thermal mass 12 reaches a predetermined maximum temperature, the maximum temperature sensing circuit transmits a warning signal to the beeper. In response to the warning signal, the beeper emits an audible signal that warns the operator to discontinue use until the thermal mass has cooled off.

As an additional safeguard, the power meter 10 includes a shutoff timer 38 coupled to the reset button 28. The reset button actuates the shutoff timer by connecting it to the positive terminal of the power source 32. After a predetermined period, such as the 22 seconds of the shutoff timer shown in FIG. 3, the shutoff timer transmits a shutoff signal to a shutoff switch 40. The shutoff switch connects the power source 32 through a resistor to ground and disconnects the power source from the voltage regulator 34. As a result, both the nine volt and five volt supplies are disconnected from the remainder of the power meter. The shutoff timer 38 also transmits the shutoff signal to a shutoff beeper driver 42, which causes the beeper 22 to emit an acoustic signal indicating that the power is going down. When the operator actuates the reset button 28 again, it causes the shutoff switch 40 to re-connect the power source 32 to the voltage regulator 34, thereby powering the power meter 10.

The power meter 10 also includes a decimal point controller 44 coupled between the holding circuits 24, 26 and the display meter 18. The decimal point controller transmits a signal to the display meter, causing the display meter to position a decimal point in the power reading in its proper position according to the value of the power reading.

It should be understood that the power meter 10 is linear in that the power of the laser energy impinging on the thermal mass 12 is directly proportional to the differentiated signal produced by the differentiator 16. Such linearity is assured by using the hold timer 20 to provide a predetermined delay period before a final power reading is computed and displayed. As such, the voltage rate measured should repeat for each application of laser energy to the thermal mass 12.

It should be further understood that while the presently preferred embodiment of the invention has been described herein using analog computing circuitry, the invention may be practiced using digital computing circuitry, such as in a microprocessor-based system.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A laser power meter for measuring the power of a laser, comprising:
   a thermal mass that receives laser energy from the laser;
   a temperature sensor coupled to the thermal mass to translate temperature changes in the thermal mass into an electrical sensor signal that varies in proportion to the temperature changes;
   a differentiator coupled to the temperature sensor to receive the electrical sensor signal and produce a differentiated signal indicative of the rate of change of voltage with respect to time of the electrical sensor signal; and
   a display meter coupled to the differentiator to receive the differentiated signal, translate the differentiated signal into a power reading and display the power reading to an operator.

2. The laser power meter of claim 1 further including:
   a hold timer coupled to the display meter, the hold timer transmitting a hold timing signal to the display meter after a predetermined delay period, and wherein the display meter includes means for holding the power reading constant in response to the hold timing signal.

3. The laser power meter of claim 2 further including an audible signal generator coupled to the hold timer, the audible signal generator emitting an audible signal in response to the hold timing signal.

4. The laser power meter of claim 1 further including a cooling rate holding circuit and a heating rate holding circuit, each of the holding circuits being coupled to the differentiator and the display meter, the cooling rate holding circuit receiving a cooling portion of the differentiated signal indicating a lowering of the temperature of the thermal mass and the heating rate holding circuit receiving a heating portion of the differentiated signal indicating a raising of the temperature of the thermal mass, the respective holding circuits sending their respective portions of the differentiated signal to the display meter.

5. The laser power meter of claim 4 wherein the display meter includes means for receiving the cooling and heating portions of the differentiated signal from the holding circuits and means for adding the cooling and heating portions together before translating the differentiated signal into a power reading.

6. The laser power meter of claim 1 further including:
   a operator-activated reset switch coupled to the differentiator, the reset switch transmitting a reset signal to the differentiator in response to an activation by a user, thereby preparing the differentiator for a new power measurement.

7. The laser power meter of claim 1 wherein the thermal mass includes a void adjacent the temperature sensor which increases thermal diffusion time in the thermal mass.

8. The laser power meter of claim 1 further including a shutoff timer coupled to a shutoff switch which is operatively coupled to the display meter, the shutoff timer causing the shutoff switch to remove power from the display meter after a predetermined delay period.

9. The laser power meter of claim 1 further including:
   a maximum temperature sensing circuit coupled to the temperature sensor, the maximum temperature sensing circuit transmitting a warning signal when the temperature sensor detects that the temperature of the thermal mass has reached a predetermined maximum temperature; and
   an audible signal generator coupled to receive the warning signal from the maximum temperature sensing circuit and emit an audible signal in response thereto.

10. A laser power meter for measuring the power of a laser, comprising:
   a thermal mass that receives laser energy from a laser;
   a temperature sensor coupled to the thermal mass to translate temperature changes in the thermal mass into an electrical sensor signal indicative of the temperature changes;
   a differentiator coupled to the temperature sensor to receive the electrical sensor signal and produce a differentiated signal indicative of the rate of change of voltage with respect to time of the electrical sensor signal;
   a cooling rate holding circuit coupled to receive a cooling portion of the differentiated signal indicating a lowering of the temperature of the thermal mass;
   a heating rate holding circuit coupled to receive a heating portion of the differentiated signal indicating a raising of the temperature of the thermal mass;
   means for receiving the cooling and heating portions of the differentiated signal from the holding circuits and adding the cooling and heating portions to create a combined differentiated signal; and a display meter coupled to the receiving means to translate the combined differentiated signal into a power reading and display the power reading to an operator.

11. The laser power meter of claim 10 further including:
a hold timer coupled to the display meter and adapted to transmit a hold timing signal to the display meter after a predetermined delay period wherein the display meter includes means for holding the power reading constant in response to the hold timing signal.

12. The laser power meter of claim 11 further including an audible signal generator coupled to the hold timer, the audible signal generator emitting sound in response to the hold timing signal.

13. The laser power meter of claim 10 further including:
a operator-activated reset switch coupled to the differentiator and the holding circuits, the reset switch transmitting a reset signal to the differentiator and holding circuits, thereby preparing the differentiator and holding circuits for a new power measurement.

14. The laser power meter of claim 10 wherein the thermal mass includes a void adjacent the temperature sensor which increases thermal diffusion time in the thermal mass.

15. The laser power meter of claim 10 further including a shutoff timer coupled to a shutoff switch which is operatively coupled to the display meter, the shutoff timer causing the shutoff switch to remove power from the display meter after a predetermined delay period.

16. The laser power meter of claim 10 further including:
a maximum temperature sensing circuit coupled to the temperature sensor, the maximum temperature Sensing circuit transmitting a warning signal when the temperature sensor detects that the temperature of the thermal mass has reached a predetermined maximum temperature; and
an audible signal generator coupled to receive the warning signal from the maximum temperature sensing circuit and emit an audible signal in response thereto.

17. A method of measuring the power of a laser, comprising:
receiving laser energy in a thermal mass;
sensing temperature changes in the thermal mass;
transmitting an electrical sensor signal indicative of temperature changes in the thermal mass;
differentiating the electrical sensor signal to produce a differentiated signal indicative of the rate of change with respect to time of the electrical sensor signal;
translating the differentiated signal into a power reading by using an amplitude value of the differentiated signal as a variable in a power reading calculation; and
displaying the power reading using a display meter.

18. The method of claim 17 further including:
transmitting a hold timing signal to the display meter after a predetermined delay period; and
holding the power reading constant in response to the hold timing signal.

19. The method of claim 18 further including;
emitting an audible signal in response to the hold timing signal.

20. The method of claim 17 further including:
separating the differentiated signal into a cooling portion indicating a lowering of the temperature of the thermal mass and a heating portion indicating a raising of the temperature of the thermal mass and wherein the translating step includes translating the cooling and heating portions of the differentiated signal into a power reading.

21. The method of claim 20 further including:
adding the cooling and heating portions together before translating the differentiated signal into a power reading.

22. The method of claim 17 further including:
resetting the display meter after a predetermined delay period.

23. The method of claim 17 further including:
detecting that the temperature of the thermal mass has reached a predetermined maximum temperature; and
emitting an audible signal in response to detecting the maximum temperature.

24. A method of measuring the power of a laser, comprising:
receiving laser energy in a thermal mass;
sensing temperature changes in the thermal mass;
transmitting an electrical sensor signal indicative of temperature changes in the thermal mass;
computing a heating rate of change of temperature with respect to time in the thermal mass based upon the electrical sensor signal as the laser energy is being received by the thermal mass;
computing a cooling rate of change of temperature with respect to time in the thermal mass based upon the electrical sensor signal when the laser energy is not being received by the thermal mass, immediately prior to or after the laser energy is received by the thermal mass;
adding the heating and cooling rates of change to produce a power measurement indicative of the power of the laser; and
displaying the power measurement.

25. A power meter fur measuring the power of an energy source, comprising:
a thermal mass that receives energy from the energy source;
a temperature sensor coupled to the thermal mass to translate temperature changes in the thermal mass into an electrical sensor signal that varies in proportion to the temperature changes;
a differentiator coupled to the temperature sensor to receive the electrical sensor signal and produce a differentiated signal indicative of the rate of change of voltage with respect to time of the electrical sensor signal; and
a display meter coupled to the differentiator and adapted to translate the differentiated signal into a power reading and display the power reading to an operator.

26. The power meter of claim 25 further including a cooling rate holding circuit and a heating rate holding circuit, each of the holding circuits being coupled to the differentiator and the display meter, the cooling rate holding circuit receiving a cooling portion of the differentiated signal indicating a lowering of the temperature of the thermal mass and the heating rate holding circuit receiving a heating portion of the differentiated signal indicating a raising of the temperature of the thermal mass, the respective holding circuits sending their respective portions of the differentiated signal to the display meter.

27. The power meter of claim 26 wherein the display meter includes means for receiving the cooling and heating portions of the differentiated signal from the holding circuits and means for adding the cooling and heating portions together before translating the differentiated signal into a power reading.

28. The laser power meter of claim 25 wherein the thermal mass includes a void adjacent the temperature sensor which increases thermal diffusion time in the thermal mass.

29. The laser power meter of claim 25 further including a shutoff timer coupled to a shutoff switch which is operatively coupled to the display meter, the shutoff timer causing the shutoff switch to remove power from the display meter after a predetermined delay period.

* * * * *

UNITED STATES PATENT AND TRADEMARK OFFICE
CERTIFICATE OF CORRECTION

PATENT NO.    :  5,409,314
DATED         :  April 25, 1995
INVENTOR(S)   :  Peter Laakmann It is certified that error appears in the above identified patent and that said Letters Patent is hereby corrected as shown below:

In column 8, claim 25, line 42, please delete "fur" and substitute therefor -- for --.

Signed and Sealed this

Twenty-sixth Day of December, 1995

Attest:

BRUCE LEHMAN

*Attesting Officer*        *Commissioner of Patents and Trademarks*